No. 721,727. PATENTED MAR. 3, 1903.
P. J. McGUIRE.
MOLDING APPARATUS.
APPLICATION FILED JAN. 31, 1902.
NO MODEL. 5 SHEETS—SHEET 1.
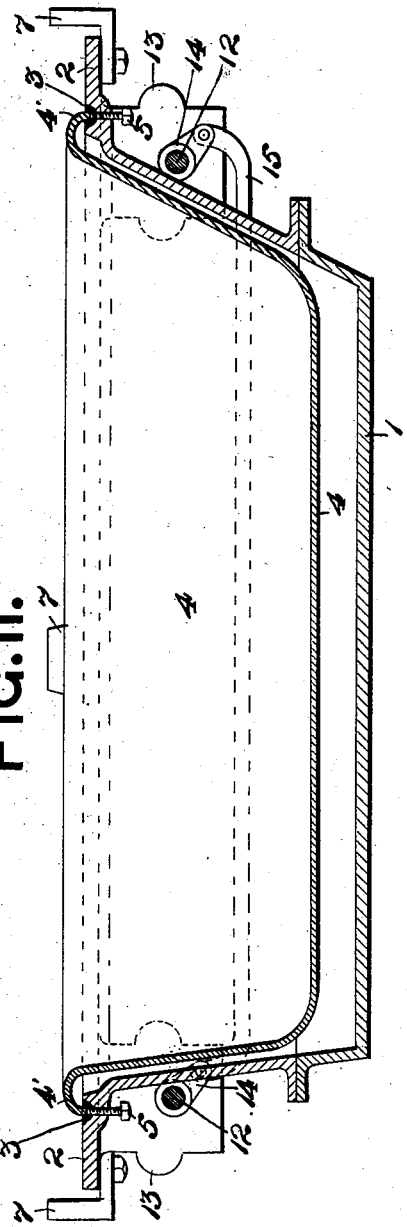
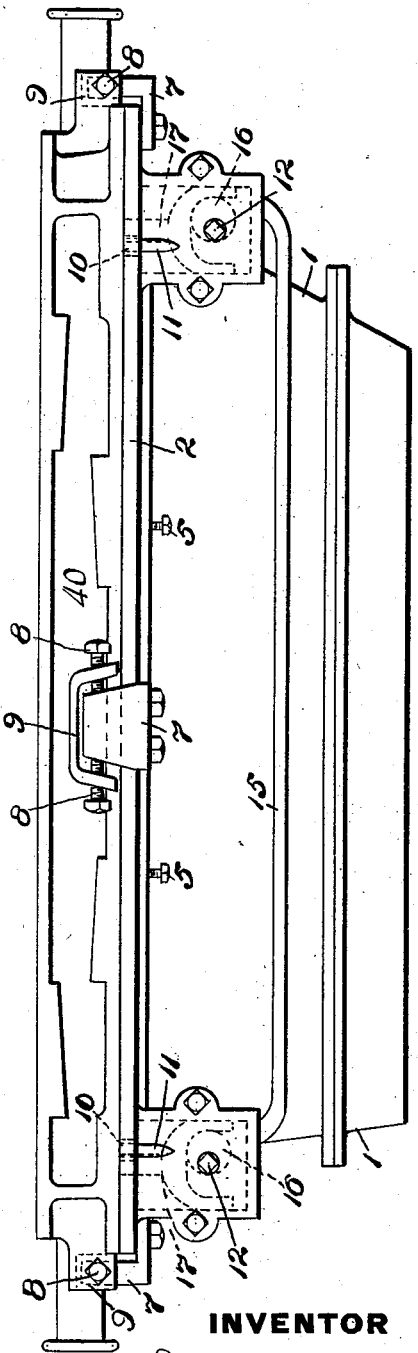
WITNESSES:
A. H. Kirchner
W. J. Fawcett
INVENTOR
P. J. McGuire,
BY his ATTORNEY
Richard D. Harrison

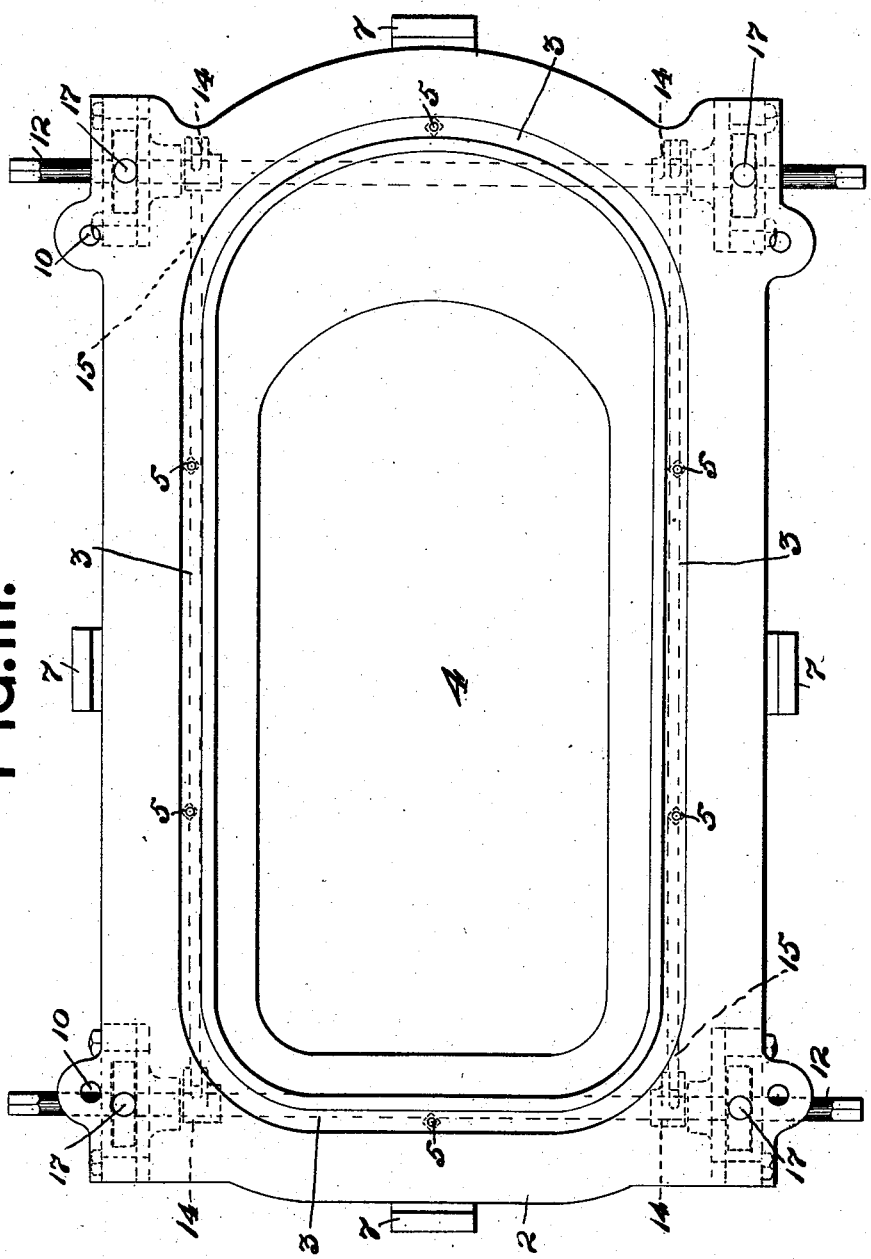

No. 721,727. PATENTED MAR. 3, 1903.
P. J. McGUIRE.
MOLDING APPARATUS.
APPLICATION FILED JAN. 31, 1902.
NO MODEL 5 SHEETS—SHEET 3.
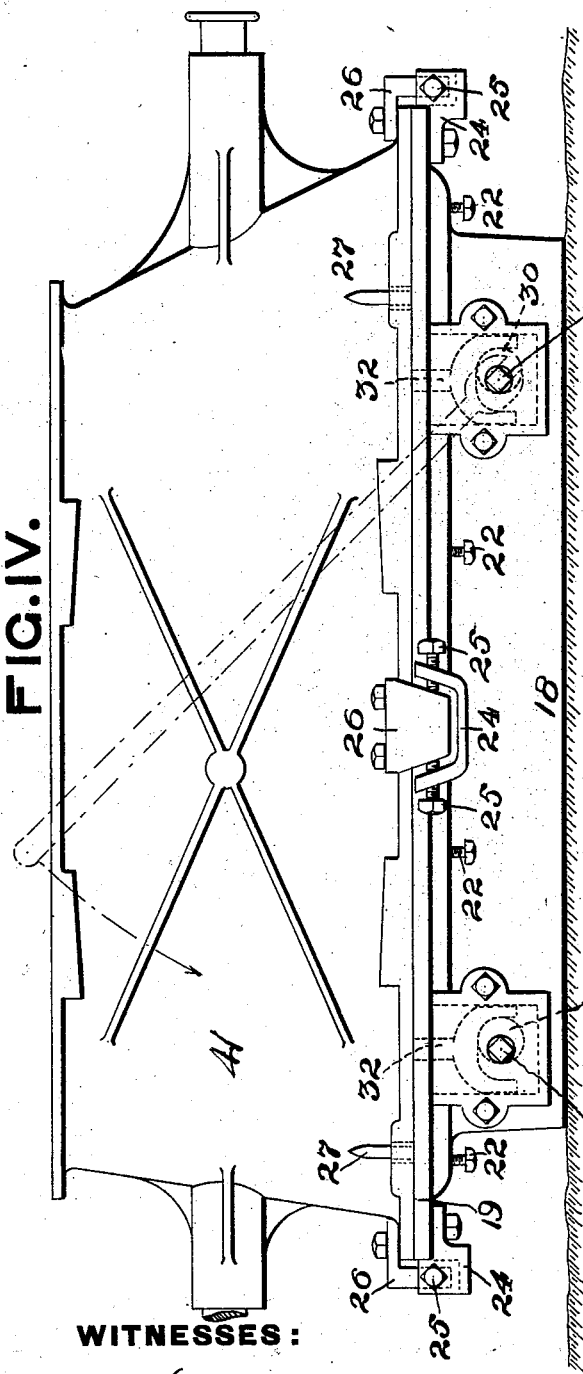
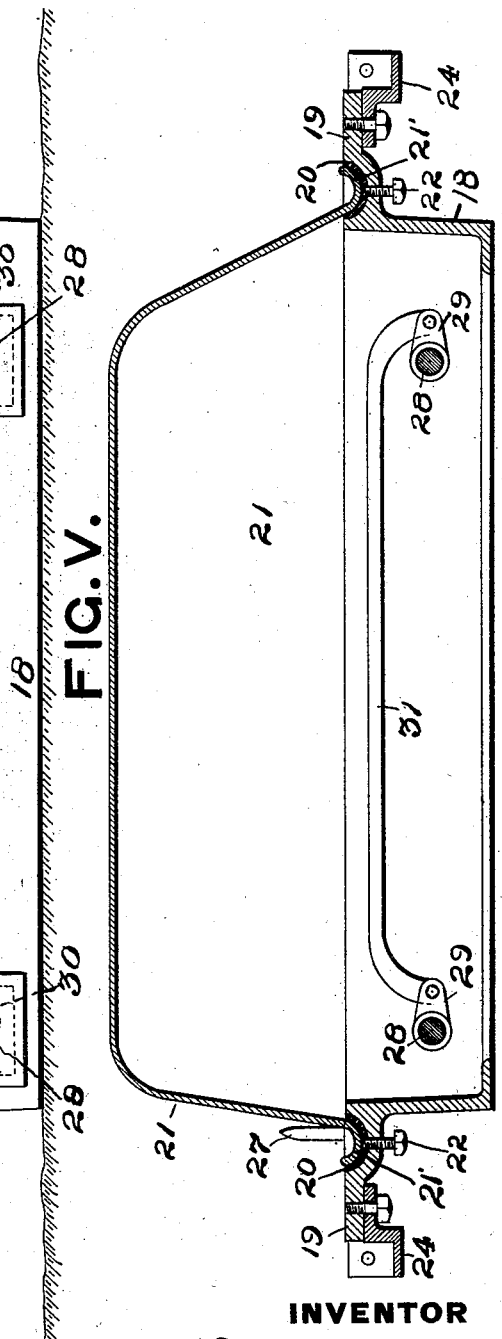

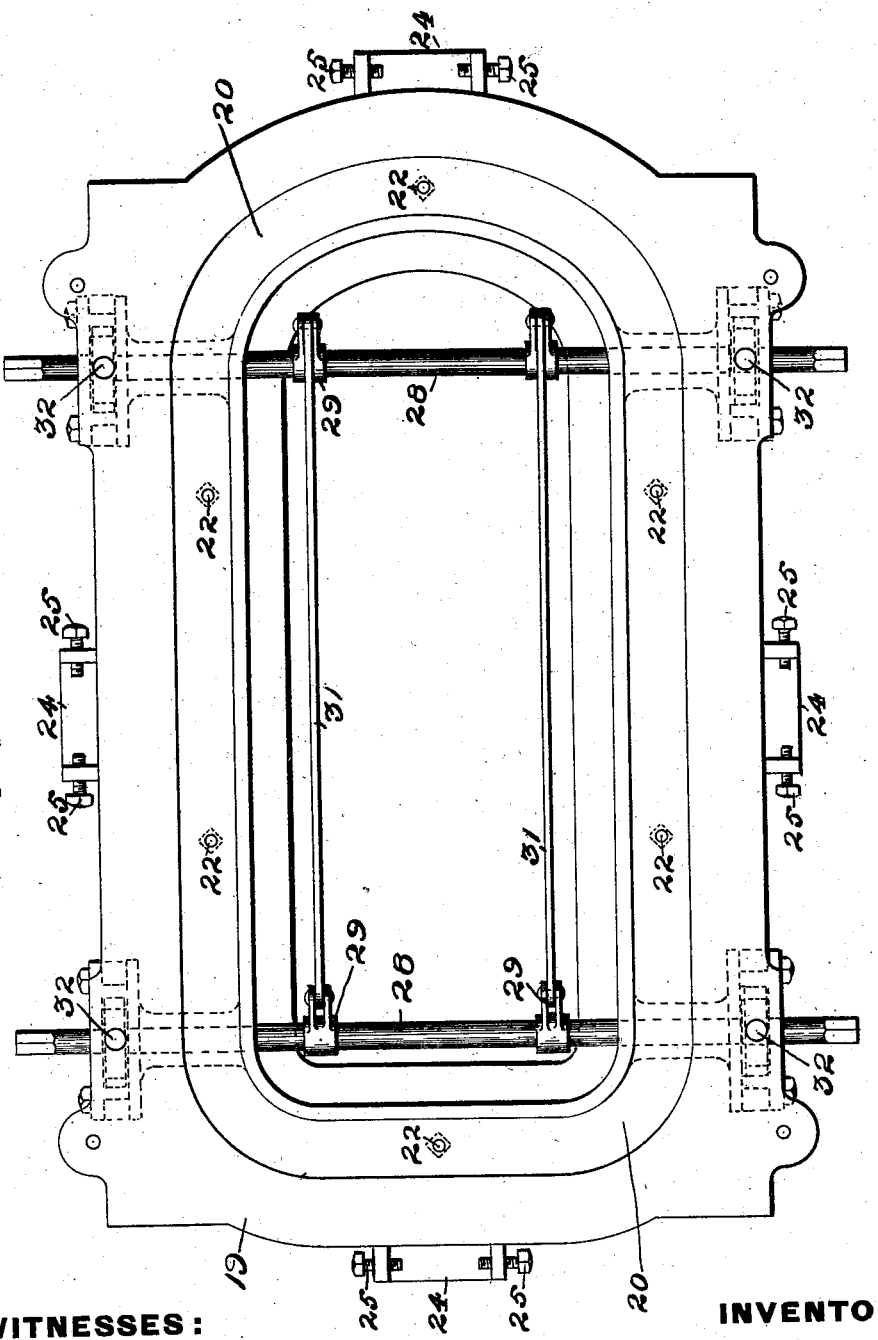

No. 721,727. PATENTED MAR. 3, 1903.
P. J. McGUIRE.
MOLDING APPARATUS.
APPLICATION FILED JAN. 31, 1902.
NO MODEL. 5 SHEETS—SHEET 5.
FIG. VII.
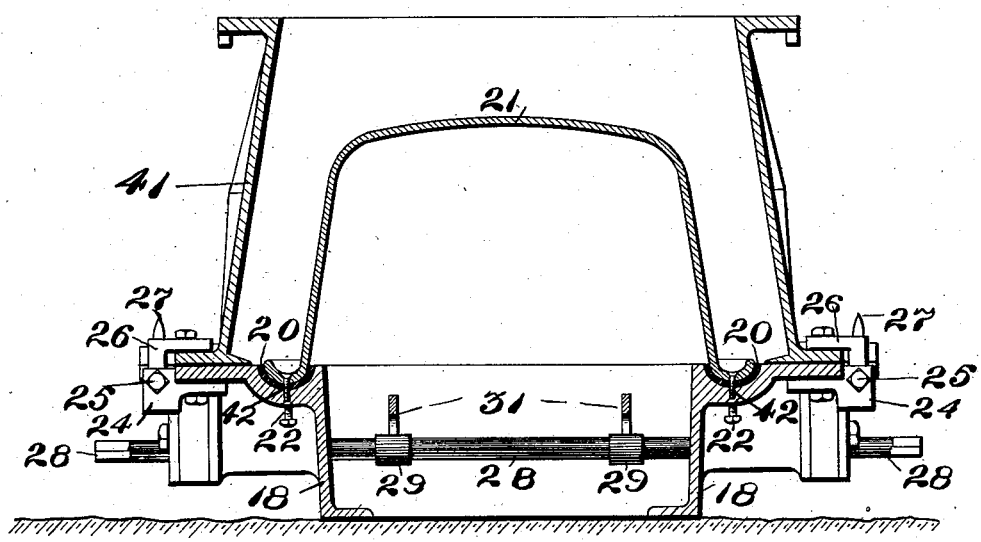
FIG. VIII.
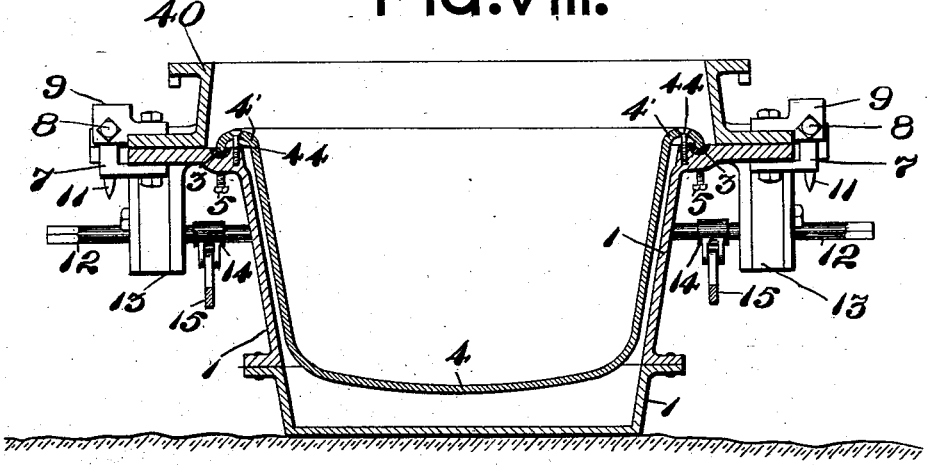
WITNESSES:
J. E. Krepps.
W. J. Fawcett.
INVENTOR
Peter J. McGuire
BY his ATTORNEY
Richard J. Harrison

UNITED STATES PATENT OFFICE.

PETER J. McGUIRE, OF BLAIRSVILLE, PENNSYLVANIA, ASSIGNOR TO THE CHAMPION SANITARY ENAMEL WARE CO., A CORPORATION OF PENNSYLVANIA.

MOLDING APPARATUS.

SPECIFICATION forming part of Letters Patent No. 721,727, dated March 3, 1903.

Application filed January 31, 1902. Serial No. 91,952. (No model.)

*To all whom it may concern:*

Be it known that I, PETER J. MCGUIRE, a citizen of the United States, residing at Blairsville, in the county of Indiana and State of Pennsylvania, have invented a new and useful Improvement in Molding Apparatus, of which improvement the following is a specification.

This invention relates to improvements in molding apparatus for bath-tubs.

The invention is adapted for use in connection with molding-flasks for which I have filed application for Letters Patent of even date herewith, Serial No. 91,951.

The invention has for its object the provision of a practical non-rapping molding apparatus of two parts for forming the cope and drag portions of the mold.

The invention consists in the novel combination and arrangement of parts as hereinafter set forth.

In the accompanying drawings I have illustrated my invention in various ways, in which—

Figure I is a side view of the drag-forming portion of the apparatus, showing the flask fitted thereto. Fig. II is a longitudinal sectional view through the same. Fig. III is a plan view of the frame portion of the drag-forming apparatus. Fig. IV is a side view of the cope-forming portion of the apparatus, showing the flask fitted thereto. Fig. V is a longitudinal sectional view through the same. Fig. VI is a plan view of the frame portion of said drag-forming apparatus. Fig. VII is a transverse sectional view through the cope-forming apparatus and flask. Fig. VIII is a transverse sectional view through the drag-forming apparatus and flask.

Further referring to said drawings for a detailed description of said apparatus, the numeral 1 designates a box-frame having formed about its upper edge the flange 2, which flange is provided with a groove 3. The tub-pattern 4 for forming the drag or hollow portion of the mold is arranged within said frame with its flanged portion 4' extending into said groove. Extending up through the flange portion of said frame into said grooves are the set-screws 5, which are adapted to engage the flange of said pattern and adjust the same vertically. When the pattern is adjusted to its proper elevation, the same is firmly united, by screws 44, extending through the flange into said frame, to said frame, and the space about the flange filled with Babbitt metal or other material virtually making said frame and pattern of one piece. A drag-flask 40 of plain unbarred character having a roundabout shape corresponding to that of the tub-pattern is mounted upon said frame and is provided at its sides and ends with guide-boxes 9. At the ends and sides of the frame are arranged the upwardly-extended tongues or guide members 7, which are adapted to engage the adjustable contact-screws 8 of the flask-guide 9. This frame is further provided with openings 10 to receive the flask-pins 11, said openings being considerably greater in diameter than said pins to permit the flask being adjusted to the proper position by said screws 8.

In connection with this apparatus a "lift mechanism" for raising the apparatus from the flask or mold after the same has been rammed up and turned over is employed. The mechanism herein shown consists of two transverse shafts 12, mounted in suitable bearings 13, which shafts carry cranks 14, connected to one another by rods 15, said shafts being further provided with cams 16 to engage the vertical lifting-pins 17. The lifting of the mold is effected by applying a lever or wrench to the end of said shafts and turning the same one quarter-revolution. The turning of said shafts actuates the pins 17, which pins, being in engagement with the flask, elevates the apparatus from the flask and mold sufficient distance to relieve said pattern therefrom.

The apparatus for forming the cope portion of the mold consists of a frame 18, having a flange 19 around the upper edge thereof, which flange is provided with a groove 20.

The tub-pattern 21 for forming the outer or cope portion of the mold is arranged upon said frame with its flange portion 21' extending into said groove. Set-screws 22 extend up through the flange of said frame into engagement with the pattern-flange to adjust the same vertically, and when the same has been properly adjusted the groove is filled with Babbitt metal or other material and the pattern permanently fixed to said frame by screws 42, extending through the flange into said frame. A cope-flask 41 of sufficient depth to extend above the pattern and give the required thickness of sand thereover is mounted upon said frame, which flask tapers and has a roundabout shape corresponding to the tub-pattern and at the ends and sides is provided with the downwardly-extended tongues 26. At the ends and sides of said frame are arranged the guide boxes or receptacles 24, which boxes are provided with adjustable contact-screws 25 to engage with the guide members or tongues 26 of the flask, said frame being further provided with pins 27 to extend through openings in said flask. This cope molding or forming apparatus is also provided with a lift mechanism similar to that of the drag-forming apparatus, consisting of shafts 28, cranks 29, and cams 30, fixed to said shafts, rods 31, connecting said cranks, and lift-pins 32 to engage said cams. The pattern parts after being adjusted vertically on both parts of the apparatus to give the required thickness of metal in the tub-bottom and united with said frames, as previously stated, each form practically a single piece or pattern part, with a flange or parting surface extending beyond the dividing-line of the tub-flange of sufficient breadth to support the flask, with means thereupon to engage the guide members of the flask to prevent lateral or longitudinal movement or displacement of said flask.

In the manufacture of cast bath-tubs it has heretofore been considered impossible to mold the same without "vibrating" or "rapping" the pattern to relieve or loosen the same from the mold previous to lifting the same therefrom, the contention being that suction of sufficient force would be created between the mold and pattern when separated as to pull the sand from and destroy the mold, owing to the great depth and extent of surface contained in such bodies. Practical demonstrations made with the apparatus herein described have proven such holdings to be erroneous, as the patterns will freely relieve themselves from the molds without such vibrating or rapping thereof.

By the employment of adjustable guide members in connection with the apparatus and flasks therefor I am enabled to adjust said flasks laterally and longitudinally in relation to the patterns to increase or decrease the thickness of metal at the sides and ends of the tub and adjust the tub-patterns vertically by screws 5 and 22 to increase or decrease the thickness of metal in the bottom of the tub to establish equality of expansion and contraction at all points of the tub-surface, and when the proper adjustment has been determined the patterns are made integral with the frames, as previously described. In cast tubs of this character the surface inclinations and curvatures at various surface portions differ greatly, and consequently the expansion and contraction would be unequal, under which conditions the enamel would crack when applied thereto and render the tub unfit as a standard sanitary article; but by the use of this apparatus it is possible by the pattern and flask adjustments to establish uniformity of expansion and contraction with little practice, and when such is established it may be maintained, with the result that each and every tub thereafter cast will be a like counterpart in thickness and weight as well as equality of expansion and contraction.

By the use of this apparatus I am enabled to produce perfect cast tubs, every one being exact in thickness, weight, &c., which is not possible when the patterns are rapped or vibrated. Furthermore, the labor and cost of production is considerably reduced.

Having thus fully shown and described my invention, what I claim as new, and desire to secure by Letters Patent, is—

1. In a molding apparatus for bath-tubs or other like hollow receptacles, a stationary support carrying the pattern and having sufficient surface extending thereabout to support a flask, a flask mounted thereupon, and means to vertically adjust said pattern wholly or either end or side thereof to establish the elevation which the same shall thereafter permanently maintain relative to said support and flask to give the desired thickness of metal in the bottom of the receptacle cast therein or equalize the expansion and contraction over said bottom surface.

2. In a molding apparatus for bath-tubs or other like hollow articles, a stationary supporting-body carrying the pattern, a flask mounted thereon, means to vertically adjust said pattern relative to the flask to establish the fixed elevation which the same shall thereafter maintain to give the proper metal thickness or equalization of expansion and contraction over the bottom surfaces of the articles to be cast from said pattern, and members to longitudinally or laterally adjust said flask to establish the proper position which the same shall thereafter assume to give the proper metal thickness or equalization of expansion and contraction at the ends or side walls of said cast articles.

3. In a molding apparatus for bath-tubs or other like hollow articles, a stationary supporting-body carrying the pattern, a flask mounted thereon, means to vertically adjust said pattern relative to the flask to establish the fixed elevation which the same shall thereafter maintain to give the proper metal thickness or equalization of expansion and contraction over the bottom surfaces of the articles to be cast from said pattern, and adjustable registering members arranged upon said flask and body at their meeting surfaces adapted to longitudinally or laterally adjust said flask to establish the proper registering position which the same shall thereafter assume to give the proper metal thickness or equalization of expansion and contraction at the ends and side walls of said cast articles.

4. In a molding apparatus for bath-tubs or other like hollow articles, a stationary supporting-body carrying the pattern, a flask mounted thereon, means to vertically adjust said pattern relative to the flask to establish the fixed elevation which the same shall thereafter maintain to give the proper metal thickness or equalization of expansion and contraction over the bottom surfaces of the articles to be cast from said pattern, adjustable registering members arranged upon said flask and body at their meeting surfaces adapted to longitudinally or laterally adjust said flask to establish the proper registering position which the same shall thereafter assume to give the proper metal thickness or equalization of expansion and contraction at the ends and side walls of said cast articles, and guide members to assist said flask to its registering position.

5. In a molding apparatus for bath-tubs or other like hollow articles, a stationary supporting-body carrying the pattern, a flask mounted thereon, means to vertically adjust said pattern wholly or either end or side thereof relative to the flask to establish the fixed elevation which the same shall thereafter maintain to give the proper metal thickness or equalization of expansion and contraction over the bottom surfaces of the articles to be cast from said pattern, and adjustable registering members arranged upon said flask and body at their meeting surfaces adapted to longitudinally or laterally adjust said flask to establish the proper registering position which the same shall thereafter assume to give the proper metal thickness or equalization of expansion and contraction at the ends or side walls of said cast articles.

6. In a molding apparatus for bath-tubs or other like hollow articles, a stationary supporting-body carrying the pattern, a flask mounted thereon, means to vertically adjust said pattern wholly or either end or side thereof relative to the flask to establish the fixed elevation which the same shall thereafter maintain to give the proper metal thickness or equalization of expansion and contraction over the bottom surfaces of the articles to be cast from said pattern, adjustable registering members arranged upon said flask and body at their meeting surfaces adapted to longitudinally or laterally adjust said flask to establish the proper registering position which the same shall thereafter assume to give the proper thickness of metal or equalization of expansion and contraction at the ends and side walls of said cast articles, and guide members to assist said flask to its registering position.

7. In a molding apparatus for bath-tubs or other like hollow articles, a stationary supporting-body carrying the pattern, a flask mounted thereon, and adjustable registering members arranged upon the ends and sides of said body and flask, said members adapted to permit the flask being longitudinally adjusted by the side members without disturbing its lateral registering position or laterally by the end members without disturbing its longitudinal registering position.

8. In a molding apparatus for bath-tubs or other like hollow articles, a stationary supporting-body carrying the pattern, a flask mounted thereon, adjustable registering members arranged upon the ends and sides of said body and flask, and guide members to assist said flask to its registering position, said adjustable members adapted to permit the flask being longitudinally adjusted by the side members without disturbing its lateral registering position or laterally by the end members without disturbing its longitudinal registering position.

9. In a molding apparatus for bath-tubs or other like hollow receptacles, a stationary support carrying the pattern and having sufficient surface extending thereabout to support a flask, a flask mounted thereupon, and a plurality of independently-operating adjusting members carried by said support and engaging said pattern whereby the elevation of said pattern may be varied wholly or either end or side thereof relative to said support and flask to give the desired thickness of metal in the bottom of the receptacle cast therein or equalize the expansion and contraction over said bottom surface.

10. In a molding apparatus for bath-tubs or other like hollow receptacles having an outwardly-extended rim around the edge thereof, a stationary support having a groove in its surface to receive the rim of said pattern with sufficient surface projecting therebeyond to support a flask, a pattern of the character set forth mounted on said support, means to vertically adjust said pattern wholly or either end or side thereof relative to said support, and a filling between said groove and pattern-rim.

11. In a molding apparatus for bath-tubs or other like hollow receptacles having an outwardly-extended rim around the edge thereof, a stationary support having a groove in its surface to receive the rim of the pattern with sufficient surface projecting therebeyond to support a flask, a pattern of the character set forth mounted on said support, a flask mounted thereon, means to vertically adjust said pattern wholly or either end or side thereof relative to said support and flask to give the desired thickness of metal in or equalize the expansion and contraction over the bottom of the receptacle cast therein, a filling between said groove and pattern-rim, and adjustable registering members arranged at the meeting edges of said support and flask adapted to longitudinally or laterally adjust the registerable position of said flask upon said support relative to said pattern to give the proper thickness of metal in or equalize the expansion and contraction over the ends or side walls of the receptacle cast therein.

12. In a molding apparatus for bath-tubs or other like hollow receptacles having an outwardly-extended rim around the edge thereof, a stationary support having a groove in its surface to receive the rim of the pattern with sufficient surface projecting therebeyond to support a flask, a pattern of the character set forth mounted on said support, a flask mounted thereon, means to vertically adjust said pattern wholly or either end or side thereof relative to said support and flask to give the desired thickness of metal in or equalize the expansion and contraction over the bottom of the receptacle cast therein, a filling between said groove and pattern-rim, adjustable registering members arranged at the meeting edges of said support and flask adapted to longitudinally or laterally adjust the registerable position of said flask upon said support relative to said pattern to give the proper thickness of metal in or equalize the expansion and contraction over the ends or side walls of the receptacle cast therein, and guide members to assist said flask to its registering position.

In testimony whereof I have hereunto signed my name in the presence of two subscribing witnesses.

PETER J. McGUIRE.

In presence of—
   CHAS. KERLER, Jr.,
   RICHARD S. HARRISON.